April 19, 1966        W. M. BOOTH ETAL        3,246,475
TELESCOPIC MARINE DERRICK STRUCTURE AND METHOD OF ERECTING SAME
Filed Aug. 28, 1961                          5 Sheets-Sheet 1

INVENTORS
WILLIAM M. BOOTH
MORRIS A. BOOTH
BY
ATTORNEYS

April 19, 1966   W. M. BOOTH ETAL   3,246,475
TELESCOPIC MARINE DERRICK STRUCTURE AND METHOD OF ERECTING SAME
Filed Aug. 28, 1961   5 Sheets-Sheet 2

INVENTORS
WILLIAM M. BOOTH
MORRIS A. BOOTH
BY
ATTORNEYS

INVENTORS
WILLIAM M. BOOTH
MORRIS A. BOOTH
BY

ATTORNEYS

INVENTORS
WILLIAM M. BOOTH
MORRIS A. BOOTH
BY
ATTORNEYS

United States Patent Office 3,246,475
Patented Apr. 19, 1966

3,246,475
TELESCOPIC MARINE DERRICK STRUCTURE
AND METHOD OF ERECTING SAME
William M. Booth, 2006 Vista Place, and Morris A. Booth,
P.O. Box 441, both of Grand Haven, Mich.
Filed Aug. 28, 1961, Ser. No. 134,467
16 Claims. (Cl. 61—46.5)

This invention relates to marine structures of the type used for offshore drilling, and particularly to such a structure adapted to drilling at the very limits of the Continental Shelf at depths of six hundred feet or even more.

A wide variety of offshore drilling rigs have been devised to make it possible to tap the best mineral reserves which lie submerged in the offshore Continental Shelf areas and in some inland lake areas. However, to date, these rigs have been limited to the relatively shallow portions of the submerged areas where the depths do not exceed one hundred and fifty or at the most two hundred and fifty feet of water. Rigs of this type are extremely expensive. They are slow and costly to move to location and often only portions of them can be recovered. They are wholly incapable of tapping the vast reserves which lie in the more deeply submerged outer fringes of the Continental Shelf.

This invention is designed to provide a structure having capability at the water depths covering these reserves.

This invention, besides providing a drilling tower or rig which will accomplish that which has never before been successfully accomplished represents a major improvement over any existing offshore drilling structure ever developed. It is a substantial improvement over marine structures used at shallower depths which are accessible to existing equipment.

This invention provides a drilling structure or tower which is completely self-contained and may be completely assembled in a dry dock or on land. This is a major advantage because the cost of constructing these rigs and assembling them in a dry dock or on land is substantially less than that of assembling them piece by piece while floating on open water.

The invention provides a drilling tower which is inherently self-buoyant and may be transported as a unit by floating it to location on the water. It requires no barge for this purpose. It only requires a motive unit, such as a tug, to tow it. Further, it is so designed that it may be readily maneuvered through a harbor and is narrow enough to pass through major canals such as the Panama Canal. While in transit, it is floated on its side, like a long, compact barge. Thus it is stable and may be handled even in a severe storm.

When the structure reaches location, it is self erecting. In doing this, it supports its own weight by floating in the water. Most of the erection process is carried out by selective flooding and emptying of tanks or water compartments within the unit to change the specific gravity of the unit with relation to the water so that the force of gravity alone is used as the basic motive power to effect its erection. Thus, large, complex, heavy duty machinery is not necessary for this purpose. Further, there is no necessity for providing such equipment in a submerged environment where it has to be completely guarded against the effects of salt water. The invention provides a means for stabilizing the unit while it is being erected and for making the necessary adjustments to precisely locate it.

When the unit is erected, only a very small proportion of the mass of the unit projects above the water and into the zone immediately beneath the water which is subject to violent wind and wave action. The large proportion of the unit is submerged deeply beneath the water and rests on the ocean floor. This gives the unit a higher degree of stability and endurance against storm action than has ever been accomplished with any other type of offshore platform or drilling structure previously devised.

The invention also provides, for the first time, an easily and completely recoverable structure which, when its work is completed at one location, may be folded up and moved to a new location. The job of collapsing and folding the structure for removal is also effected by changing the specific gravity of selected portions of the rig so that the forces of gravity and of floatation are used to supply all or almost all of the energy necessary to execute the maneuver.

The rig is so designed that portions of it may be recovered for reuse and portions of it may be allowed to remain as a structure permanently serving a completed well or well complex. It may serve as a structure for subsequent service of the various equipment which surrounds a successful well, such as the Christmas tree installed at the head of the well. Also, its tanks which were originally used to control its floatation and erection may be used as submerged storage tanks for oil.

These are but some of the major advantages to be obtained from this invention. Many others will be readily apparent to those acquainted with the design and use of offshore drilling equipment upon reading the following specification and the accompanying drawings.

In executing the objects and purposes of this invention, there is provided a structure or tower having at least two sections, an upper one and a lower one. These sections are telescopically interrelated. To the upper one are mounted a platform and a derrick. The tower has a plurality of foldable base members. These, in folded position, substantially enclose the tower, including the platform. When extended, they project laterally from the tower and form a wide spreading base supporting the tower on the marine floor. The base members are internally divided into a number of independent compartments which may be flooded or blown to vary the specific gravity and thus the floatation characteristics of the base members and thus of the tower. Further, this may be done in selected compartments to determine the weight distribution along the length of the base members to control and manipulate their movements.

The tower also has a collar which slides lengthwise of the lower section. This sliding collar is connected to the base member by links. The collar provides the tying structure for the base members and forces them to act as a single, coordinated unit. It also has a number of individual compartments by which its specific gravity with relation to that of the surrounding water may be varied to manipulate its movement along the length of the lower member of the tower.

In one form, the upper member of the tower has a floatation unit at its lower end to control its movement relative to the lower portion of the tower and also to control the specific gravity of the tower as a whole. In another form of the invention, the upper section is mechanically raised with relation to the lower section. In this construction the floatation unit may be omitted.

Description FIGURES 1–14

Figure 5:
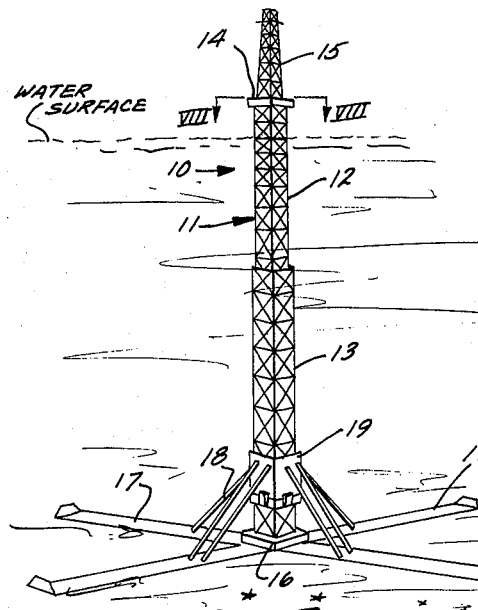
FIG. 5 is an oblique, somewhat schematic view showing the tower fully extended and resting on the marine floor.

Referring specifically to the drawings and to FIG. 5, the structure 10 has a telescopically extensible tower 11. The tower 11 has an upper portion, or elevator shaft, 12 which telescopically interfits within the lower portion or sleeve 13. The elevator shaft 12 is topped by a buoyant platform 14 upwardly from which extends the derrick 15. At the bottom of the lower portion or sleeve 13, the tower is surrounded by a base or fixed collar 16. Legs or base members 17 are pivotally secured to the base collar 16. The base members 17 are further secured to the tower by the links 18 which are, at their upper ends, pivotally secured to the sliding collar 19.

The structural members from which the upper and lower portions 12 and 13 are constructed may be of a wide variety of designs. For the purpose of maintaining a high weight to strength ratio, tubular members may be used for this purpose. If these tubular members are properly sealed, they will serve as air chambers in the tower to increase its floatational characteristics and thus reduce its specific gravity relative to the water in which it is used. Also, as tubes they may serve as conduits for the various control pipes and electrical wiring necessary to manipulate and operate the tower both during its erection and recovery and during its actual period of use while on location. The details of these structural members are not a part of this invention and therefore they are not illustrated in detail.

Figure 9:
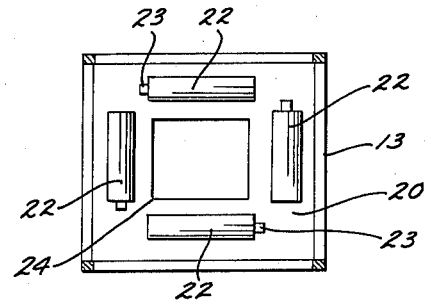
FIG. 9 is a sectional view taken along the plane IX—IX of FIG. 11.
Figure 11:
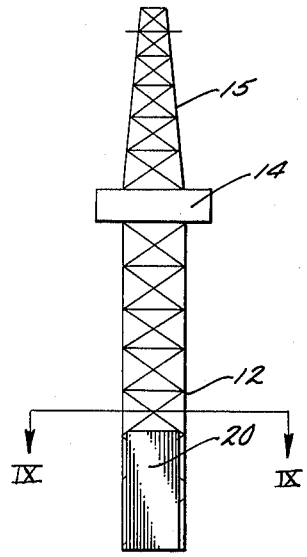
FIG. 11 is a somewhat schematic, side elevational view of the upper section of the structure with platform and derrick attached.
Figure 12:
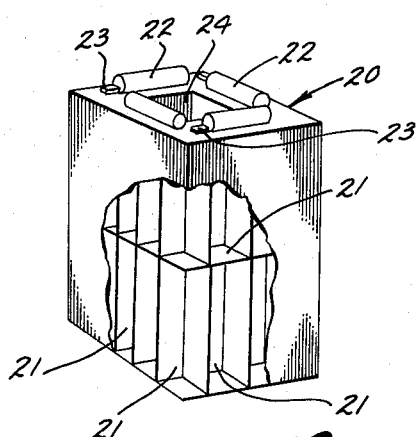
FIG. 12 is a somewhat schematic, oblique, partially fragmentary view of the floatation chamber for the upper section of the structure.

The elevator shaft 12 is an elongated tower section fabricated of sufficient structural members to give it the proper strength to withstand the forces applied against it by wind and wave action, since this section passes through the turbulent zone at, and just below, the surface of the water. In the form of the tower illustrated in FIGS. 1 through 5, at its lower, it has an internal floatation chamber 20 (FIGS. 9, 11, and 12). The floatation chamber 20 is subdivided into a number of internal compartments 21, as suggested in FIG. 12. Each of these compartments is functionally isolated from each adjacent compartment. These compartments are serviced by high pressure air storage tanks 22 which, as illustrated in FIGS. 9 and 12, may be mounted on the upper end of the floatation unit. The storage tanks 22 are connected to the various compartments by suitable conduits and the flooding and the blowing of the individual compartments 21 is controlled by suitable valve means 23 associated with each tank. The floatation unit 20 is firmly secured to the structure of the elevator shaft 12. It will be noted that the floatation unit 20 has a central opening 24 extending through it. This opening permits the lowering of the drills and other equipment through the floatation unit to afford them access through the center of the tower to the marine floor where the drilling is to be done. The purpose of the floatation unit 20 will be explained subsequently under "Operation."

Figure 8:
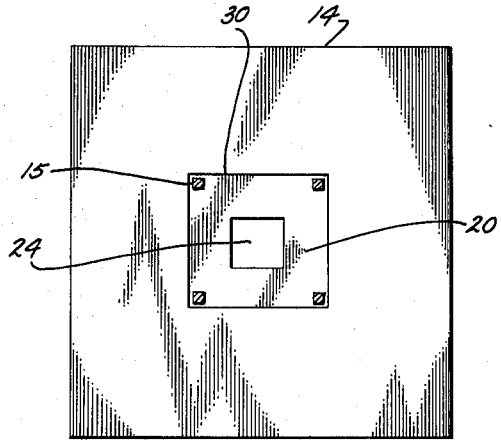
FIG. 8 is a sectional view taken along the plane VIII—VIII of FIG. 5.

At its upper end the elevator shaft 12 mounts a buoyant platform 14. This platform is also subdivided into a number of separate compartments. Thus, it is a floatation unit and will support a substantial weight by reason of its buoyancy. The platform is of such size that it serves as the deck mounting the drilling equipment and from this decking the drilling is conducted. Within the platform various service areas for the tower may be provided. These may include, among others, storage rooms, galley, machine shops, communications room, engineering control office, and living quarters for the drilling crew. As illustrated in FIG. 8, the buoyant platform 14 has a central opening 30 through which projects the derrick portion 15 of the upper section of the tower. The derrick extends above the platform to serve as the means for handling the drill casing, bits, and other equipment which must be lowered through the tower to conduct the drilling.

While the platform 14 may be secured permanently to the upper section 12, it is also possible to make it detachable so that it may be released quickly in event of emergency and it be desirable to allow the platform to operate as an independent unit from the tower. If, for example, something happened to cause the tower to sink, the platform could be released and, by its own buoyancy, it would float in the manner of a raft until rescue of the men and equipment aboard could be effected.

Figure 10:
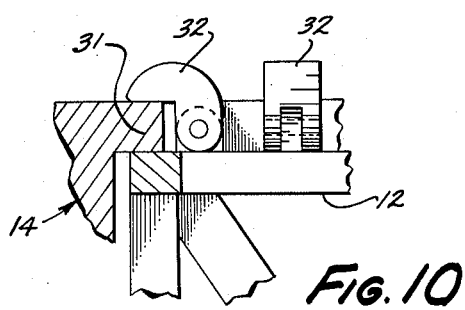
FIG. 10 is an enlarged, fragmentary, sectional view showing one means of securing the platform to the structure.

While this can be carried out in many different ways, FIG. 10 suggests that the platform 14 have a laterally extending, heavy, structural lip 31 which seats over the top edge of the upper section 12. It is secured to the upper section by the clamps 32. In an emergency, the clamps 32 can be released or moved back to permit the platform 14 to disassociate itself from the tower. The clamps can be manually or power operated, depending upon the design actually applied to the tower. In such an event, to eliminate possible difficulty with the derrick 15, the derrick may be made detachable from the elevator shaft 12. In this case, it would be released and jettisoned before the platform 14 is released.

The lower member or sleeve 13 is of such size that it can receive the elevator shaft 12 within it. The two are telescopically interrelated so that all that portion of the elevator shaft 12 below the platform 14 may be received within the lower section or sleeve. Suitable guide means are provided to structurally interrelate the sections of the tower to permit this telescopic action. A substantial overlap is provided between the upper and lower sections 12 and 13 even when the tower is fully extended. This is necessary to provide adequate strength in the tower so that the upper section is fully supported to withstand the loads which are applied by wind and waves. In a tower for very deep water this overlap should be from fifty to one hundred feet. In appropriate circumstances it may be increased or decreased.

Figure 13:
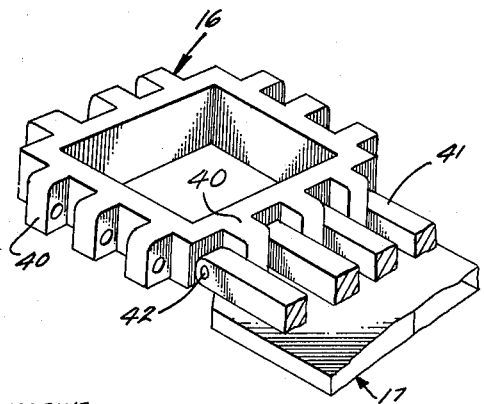
FIG. 13 is a somewhat schematic, oblique, partially fragmentary view of the fixed collar for the structure.

Surrounding the bottom of the lower section or sleeve 13 is a fixed collar 16. The fixed collar 16 is firmly secured to the lower end of the sleeve. It is equipped with outwardly projecting hinge lugs 40 (FIG. 13). The hinge lugs 40 are received between the hinge bars 41 of the base members 17. The lugs and the bars are tied together by suitable hinge pins 42. In the particular embodiment illustrated, the tower is square in cross section and therefore the fixed collar 16 has four sides. To each side one of the base members 17 is attached. It will be recognized that where the tower is of different cross-sectional configuration, such as triangular, the collar 16 will have only three sides and thus only three of the base members 17 will be used.

Figure 6:
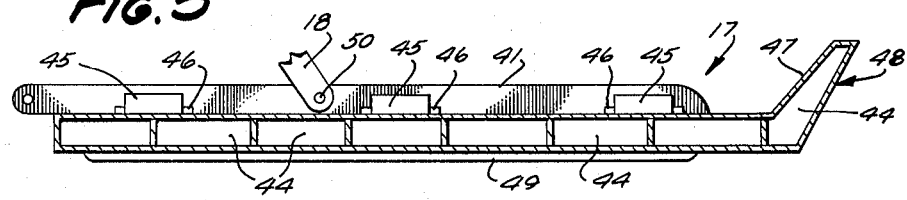
FIG. 6 is a somewhat schematic, sectional, elevational view through one of the base members illustrating the compartmentalization.
Figure 14:
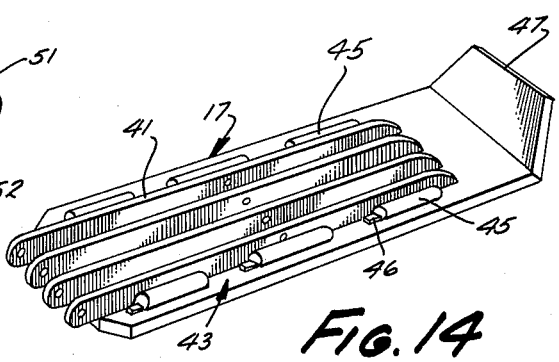
FIG. 14 is a somewhat schematic, oblique view of one of the base members.

The base members 17, as best illustrated in FIGS. 6 and 14, each has a large, hollow pontoon portion 43. The pontoon portion 43 is secured to and braced by the hinge bars 41 which preferably extend along the greater part of its length. These are secured to the upper surface of the pontoon portion and, in effect, provide the basic rib supporting structure for the base members. The pontoon portion 43 is subdivided into a number of independent compartments 44 which may be flooded to increase the specific gravity of the base member or blown to decrease the specific gravity of the base member. To supply air for blowing them, storage tanks 45 are provided at suitable intervals along each of the base members on both sides of the hinge bars 41 (FIG. 14). Associated with each of the storage tanks is a valve control unit 46 by which the flow of air from the tanks to the individual compartments 44 may be regulated. The tanks 45 are connected to the various compartments by suitable conduits so that each compartment may be individually and separately controlled and its flooding or blowing conducted independently of any of the other tanks.

The upturned end 47 is spaced outwardly from the ends of the ribs 41. The space thus created permits the base members 17 to seat around and enclose the platform 14 when they are folded.

The lower surfaces of the base members 17 have one or more ridges 49 extending a major portion of the length of the base members. These ridges serve several purposes. They strengthen the pontoons 43. During towing, they act as keels, reducing yaw and the side slipping effect of strong cross winds. When the tower is erected, they sink into the mud line of the marine bottom and grip the mud to stabilize the tower.

Figure 7:
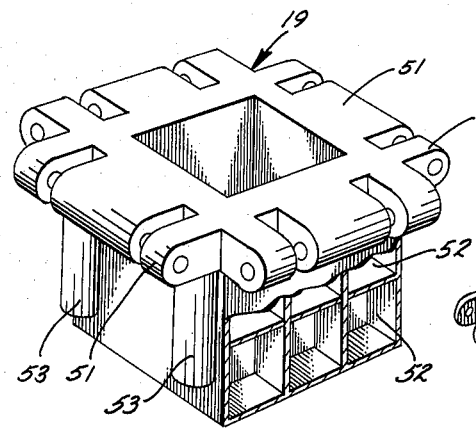
FIG. 7 is an oblique, partially fragmentary view of the sliding collar illustrating the compartmentalization.

In the particular construction illustrated, each of the base members 17 is pivotally connected at 50 to one or more links 18. The upper ends of the links 18 are pivotally connected to thhe sliding collar 19. For this purpose the sliding collar 19 has a number of outstanding hinge lugs 51 (FIG. 7). The links 18 are secured by suitable pins to provide a pivoted joint with the lugs 51. The sliding collar has a portion extending below the lugs 51 which internally is subdivided into a number of independent separate compartments 52. These compartments make the sliding collar 19 a floatation unit and when they are filled with air they give the sliding collar a specific gravity substantially less than that of water. To service the compartments 52, air tanks 53 are provided which, as will be brought out later, are equipped with suitable valving units so that the individual compartments 52 may be flooded or blown independently to control the specific gravity of the sliding collar. The tanks 53 are connected to the individual compartments 52 by suitable conduits.

The sliding collar 19 surrounds the sleeve 13 and slides along its exterior. Suitable guide ways or other guide means may be provided to assure a smooth, sliding movement of this collar. A number of suitable mechanical devices for this purpose are well-known to the marine tower and derrick field. The sliding collar 19 is limited in downward travel by a stop member 54 affixed to the lower section or sleeve 13. This is normally set to intercept the sliding collar where the base members 17 are extended to a position normal to the vertical center line of the tower.

Figure 1:
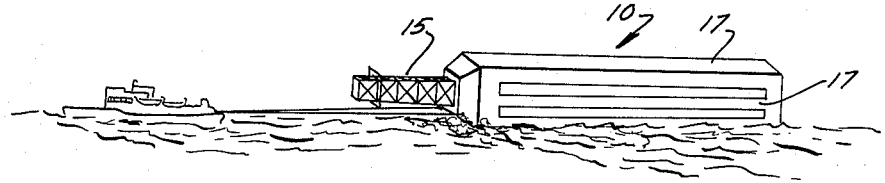
FIG. 1 is an oblique, somewhat schematic view of the structure being towed to location.
Figure 2:
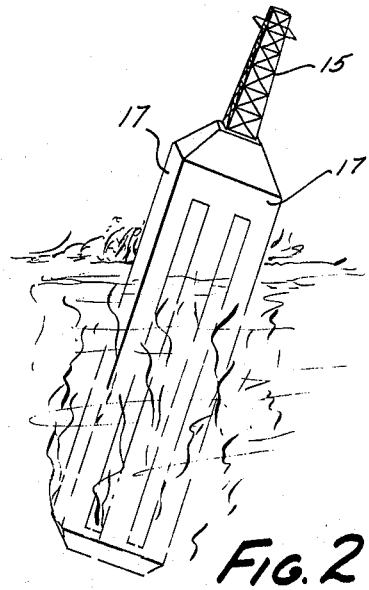
FIG. 2 is an oblique, somewhat schematic view showing the structure righting itself into vertical position.

Lock means 55 are provided on the stop 54 for securing the sliding collar 19 to the stop 54. These may be of any suitable construction such as a hook which engages a suitable socket in the sliding collar. The lock means are remotely controlled by any suitable actuating mechanism which may be electrical, hydraulic, or pneumatic. Many conventional actuating mechanisms suitable for this purpose are well-known in the marine construction field. As an example of such a known mechanism, reference is made to United States Patent 2,908,142 issued October 13, 1959 to Suderow. A remotely controlled locking means suitable for use in the practice of this invention is shown in FIGS. 1, 6 and 6a.

Description FIGURES 16–19

FIGS. 16 through 19 illustrate a modification of this invention. In this construction the sleeve 13, base members 17, sliding collar 19, and related components are the same as the corresponding structure of the tower illustrated in FIGS. 1 through 4 except the structural lip 31 illustrated in FIG. 10 is omitted from the platform. The upper section 12a is similar to the upper section 12 except that it has a rack 80 on each of two of its faces. The racks 80 extend vertically up these faces. The racks 80 cooperate with suitable driving or pinion gears 81. These are mounted within the buoyant platform 14a. The gears 81 may be driven by any suitable prime moved, the power plant for which may be mounted on or in the platform 14a. By manipulation of the gears 81 the upper section 12a may be raised with respect to the lower section 13 to effect extension of the tower. During this procedure the platform 14a is secured to the lower section 13. The upper section or elevator shaft 12a may have a floatation unit similar to the floatation unit 20. However, this may be omitted since a portion of the function of such a unit is performed by the rack and gear combination 80 and 81. The significant difference in operation between these two forms of the invention will be brought out under "Operation."

Figure 15:
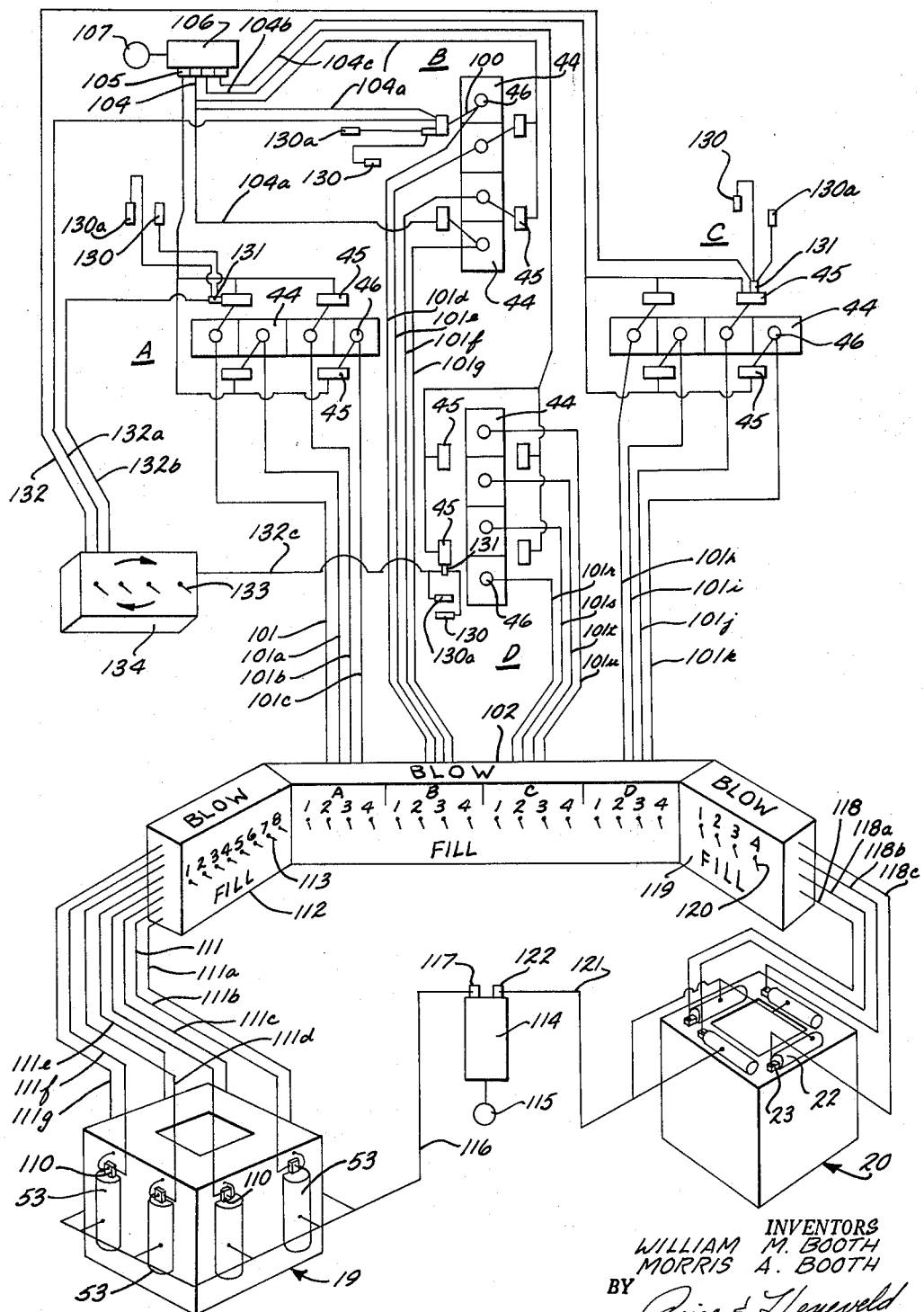
FIG. 15 is a schematic diagram of an operating and control means for the structure.
Figure 16:
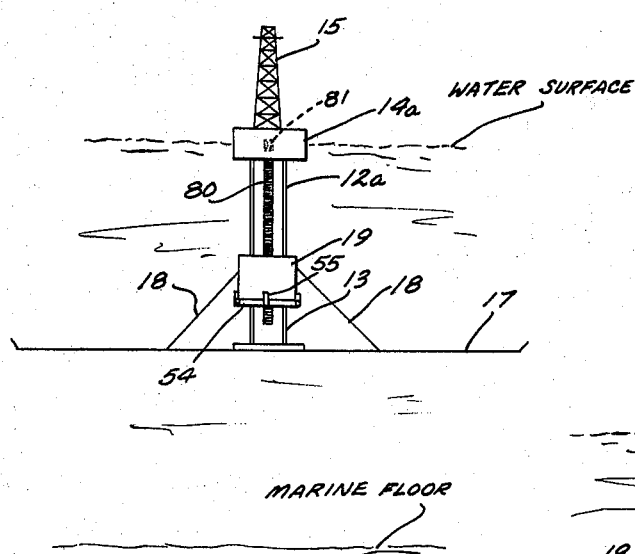
FIG. 16 is a schematic, side elevational view of a modified structure with the base opened.
Figure 17:
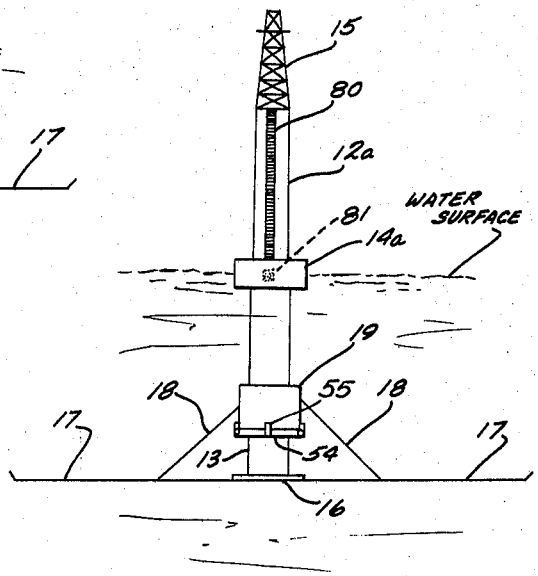
FIG. 17 is a schematic, side elevational view of the structure illustrated in FIG. 16 after the upper section of the structure has been extended.
Figure 18:
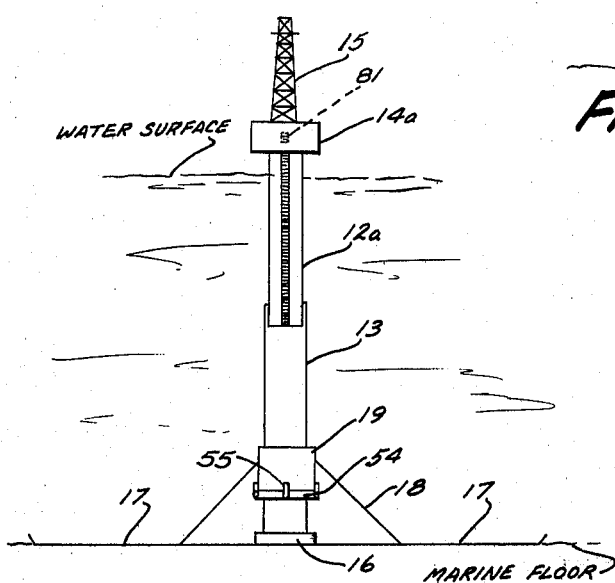
FIG. 18 is a schematic, side elevational view of the structure illustrated in FIG. 16 showing the structure lowered to rest upon the marine floor.
Figure 19:
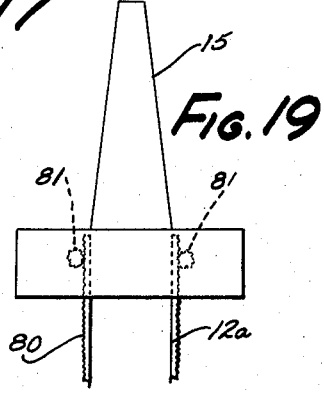
FIG. 19 is a schematic, fragmentary, side elevational view of the mechanism for extending the upper section of the structure illustrated in FIG. 16.

Operating controls—FIG. 15

It will be recognized that a large number of control arrangements may be utilized with this tower to control the operation of the tower. FIG. 15 illustrates schematically a system which will effect control of the unit. In this illustration and the following description on a selected number of compartments, air supply tanks and attendant controls are included. The number chosen should not be considered as inclusive since only a sufficient number of the components have been illustrated to describe the control system, no attempt being made to illustrate all possible multiples of the system.

The various compartments 44 which control the floatation characteristics of the base members 17 are each illustrated as connected by a suitable conduit 100 through one of the valving units 46 to one of the supply tanks 45. Each valving unit 46 is controlled by a suitable electrical circuit 101 from a central control panel 102. The valving unit 46 is designed, in one position, to admit water to and exhaust air from a compartment 44 and, in another position, to admit air to and discharge water from the compartment. The admission of air to the compartments to force water from them constitutes "blowing" of the compartments. The storage tanks 45 are, in this embodiment, charged at high pressure with compressed air. This air may be at pressures of two thousand or more pounds per square inch. When the unit is submerged below the surface, this pressure is less effective against the walls of the tanks since they will be supported by the surrounding pressure of the water in which the tower is submerged.

The flooding and blowing of each of the compartments 44 is individually controlled through appropriate, separate circuits, as suggested by the circuits 101, 101a, 101b, and 101c. Each of these circuits leads to the control panel 102 where it can be manually controlled by one of the individual switches 103. Thus a separate circuit is provided to control each tank, as suggested by the circuits 101 through 101c for the base member A, the circuits 101e through g for the base member B, the circuits 101h through k for the base member C, and the circuits 101r, s, t and u for the base member D. It will be recognized that while only four compartments are illustrated as used with each base member, that the number of compartments may be much greater and thus the number of individual control circuits will be increased correspondingly. A single storage tank 45 may serve several of the compartments 44. In this case, an additional valving unit 46 will be added for each compartment served. A separate circuit 101 and control switch 103 will also be added.

Since each circuit is individually controlled by one of the switches 103, the operator can, by selective manipulation of the switches, independently and separately control the flooding or blowing of each of the compartments 44. In this manner the change in specific gravity of the base members may be effected slowly and selectively. This permits the operator to float the tower with precise control of the position of its center of gravity and to accurately program the manipulation of the various components of the tower.

The individual storage tanks 45 may be supplied through suitable pressure lines by compressed air. The supply lines 104a, 104b, and 104c are provided for this purpose. The charging of these tanks through these lines may be controlled through the valves 105. The air is obtained from a suitable supply tank 106, which is connected to a compressor 107. The compressor and supply tank may be located on the platform 14 or it may be located on a tender anchored near the tower.

In the particular arrangement shown, all of the supply tanks on a single base member, such as the base member A, are charged simultaneously from the compressor. However, it will be recognized that individual valve controls may be provided at each tank which valve controls are separately regulated by suitable circuitry from a master control panel, permitting each tank to be separately charged. It will also be recognized that it is entirely possible to so design the storage tanks 45 to contain enough air initially to do all of the necessary programming of the unit both for the purposes of erecting it at location and of later recovering it. In this case the compressor and the necessary connecting line to supply the tanks can be eliminated and the tanks filled before the unit is submerged.

The specific gravity and thus the floatation characteristics of the sliding collar 19 may likewise be controlled. As has already been previously described, it is equipped with storage tanks 53. These are provided with control valves 110. The number of storage tanks provided for the sliding collar 19 will depend upon the size of the collar and the number of compartments 52 involved. It will also depend upon whether the tanks are designed to have an outside supply of compressed air or to be completely self-sufficient for erecting and recovering the tower. Each of the supply valves is individually controlled by an electrical circuit, such as the circuits 111 through 111g. These control circuits are all connected to the control panel 112 where each individual circuit is controlled by a separate switch 113. The switches 113, like the switches 103, permit the operator to remotely control the filling and blowing of the individual compartments 52 within the sliding collar 19. Where the tanks 53 are rechargeable, a main supply tank 114 and a compressor 115 are provided. These are connected to the tanks 52 through the supply line 116 and control valve 117.

A similar arrangement is provided for the floatation unit 20 of the upper section 12. In this case the supply tanks 22 each have a regulatory valve 23. The regulatory valves are individually controlled through the separate circuits 118 through 118c. These circuits are all controlled through the control panel 119 which is equipped with the switches 120, one of which controls each of the circuits independently. These tanks may be charged by a separate compressor or they may be supplied from the compressor 115 through the supply conduit 121 and the control valve 122.

It will be seen from this arrangement that a single operator can manipulate the specific gravity or floatation characteristics of the entire tower or of each of the individual components within the tower to manipulate it, to control extension and retraction, to control its altitude, and to control its position both as it is being erected and as it is recovered. By bringing all of the controls together in a single control panel, a single operator can quickly and with a high degree of accuracy manipulate the unit despite its size and weight. To aid the operator in this function, the tower may be equipped with suitable instruments such as horizon and bank indicators, depth gages and instruments to determine whether it is sinking or rising. A more detailed description of the manipulation of the unit will be presented under "Operation."

For the purpose of manipulating the tower while it is partially erected but floating, air jets 130 and 130a may be provided on each of the base members 17. These are illustrated schematically in FIG. 14. Preferably they are mounted near the outer extremities of the base members to have the greatest moment arm for purposes of maneuvering the unit. All of the jets are positioned to discharge horizontally. The jets 130 are all arranged to discharge in the same direction and the jets 130a are arranged to discharge in the opposite direction. The jets are preferably supplied from one of the supply tanks 45 through a special programming control valve 131. Each of these valves is controlled by one of the control circuits 132 through 132c. These control circuits are connected to the switches 133 in the control panel 134. Thus by manipulation of the switches 133, the tower may be gradually rotated or shifted in position to exactly position it on the selected location. Because the tower is floating, even a reasonably small air jet will effect movement of the tower within the water.

*Operation*

Since the unit is completely self-contained and is buoyant, it may be constructed on land or in a dry dock and then moved to location. This, in itself, is a substantial advantage. All of the various components of the structure may be assembled in an environment which is particularly conducive to this type of work. The cost of assembly as a floating platform or beneath the surface of the water is eliminated. This not only speeds up the construction job but greatly reduces its cost and complexity.

The assembled unit is floated to location. For this purpose, one of the base members 17 may be so constructed that it has sufficient buoyancy to act as a barge for the entire unit. Alternately, all of the base members may be built with sufficient buoyancy to act in this capacity. In this latter case, it is immaterial on which side the unit is floated. In order to control the stability of the tower while being towed to location in prone position, the buoyancy of the selected base member may be varied so that the tower will float low enough in the water to be stable. The ridges 49 on the bottom side of the base members 17 act as directional stabilizers to further facilitate the towing of the tower.

With the tower prepared for towing to location, the base members are folded up about the tower and locked together against accidental extension or opening. In this position they are parallel to the tower and embrace and enclose all of the tower structure except a portion of the derrick 15. Even the platform 14 is encompassed within the enclosure created by the legs 17. The upturned outer ends 47 of the legs 17 provide the tower with a suitable bow to facilitate towing. By eliminating a square bow and by giving it a slight hydrofoil effect, the yawing of the unit is either eliminated or greatly reduced. Further, the main interior structure of the tower is protected against wave action during the towing operation. During the period of movement from fabrication point to location, the buoyancy of the tower may be controlled through special control cables from the towing boat. Thus, the tower's center of gravity may be kept low enough to prevent excessive rolling or pitching. In the flat or prone position in which the tower is towed, the tower may be moved through harbors, canals, and may even be towed transoceanically because of its relatively narrow beam and its stability in the water.

During the towing operation, the upper and lower sections 12 and 13 are fully retracted and are locked together against any relative movement. This prevents any accidental extension of the sections due to heavy seas.

When the tower reaches location, appropriate compartments within the tower are flooded to shift the center of gravity of the tower from one lying parallel to and almost at the waterline to a point adjacent the lower end of the tower. This will cause the lower end of the tower to sink in the water and the tower will erect itself or assume an attitude normal to the surface of the water, as suggested in FIG. 2, wherein it is shown in the process of reaching erected position. During this maneuver the specific gravity of the over-all structure is maintained at a value which is less than that of the water so that it will float independently without aid from auxiliary ships such as a barge or special floats provided for that purpose.

To effect this change in attitude, the compartments within the base member 17 being used as the buoyant barge member and adjacent the fixed collar 16 are first flooded. As the tower continues to tip, similar compartment in others of the base members 17 are flooded to cause the tower to float low enough in the water to be stable. For this purpose the center of gravity is shifted to a point sufficiently below the water surface to prevent excessive pendulum-like motion. This initial flooding action will be controlled from the towing ship. FIG. 15 illustrates how this can be done. Assuming that the base member A of FIG. 15 is being used as a barge, the innermost of the compartments 44 is flooded. This is accomplished by moving the switch No. 4 of the section A of the control panel 102 down to fill. This will permit air to bleed out of the compartment and water to enter the compartment through the control valve 46. After the tower has shifted its attitude sufficiently to submerge the lower ends of the other leg members, the remainder of the switches 4 in the banks B, C, and D are moved to fill position to increase the weight of the tower at this end and further shift the center of gravity below the surface of the water.

For further shifting of the center of gravity, the controls regulating the specific gravity of the floatation unit 20 can be manipulated. Thus one or more of the switches 120 in the control panel 119 can be moved to fill position to flood certain of the compartments within the floatation unit. Since the tower at this point is retracted, the floatation unit 20 is near the base of the tower where a change in its specific gravity will tend to materially lower the center of gravity of the whole tower unit.

Figure 3:
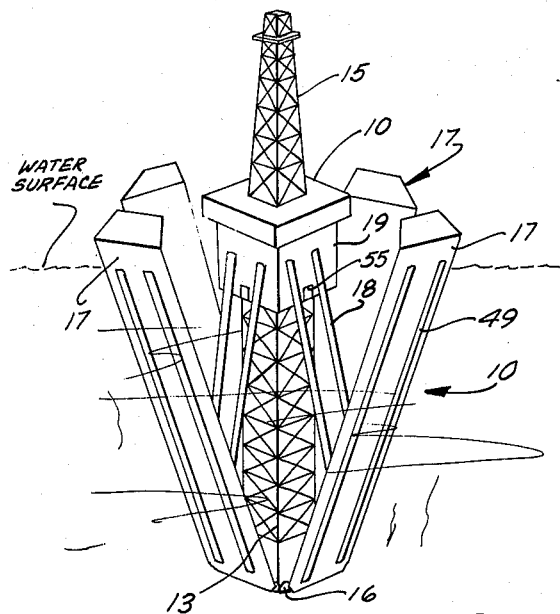
FIG. 3 is an oblique, somewhat schematic view showing the structure with the base members partially opened.

After the tower has reached an upright attitude, the base members 17 are opened or erected. They are first unlocked to permit opening or erection. For this purpose, those of the compartments 44 adjacent the surface of the water are flooded. These will be the compartments at or adjacent the outer ends 47. Some or all of the compartments in the sliding collar 19 are also flooded. The combined added weight causes the base members 17 to pivot outwardly, partially by reason of the imbalance in weight distribution in the base members and partially by reason of the outward force exerted by the added weight of the sliding collar 19 (FIG. 3). As the base members 17 open, additional compartments 44 adjacent the outer extremities of the base members, as they become submerged, will be flooded to maintain a center of gravity of the base members with relation to their hinged connection to the fixed collar 16 at a point which will assure continued downward movement or spreading of the base members.

As the base members move to fully submerged position, they will, of course, relieve the floatation units of the tower of some of the weight they have to support because of their suspension in the heavier medium. However, the flooding of certain of the floatation compartments will reduce the buoyancy of the over-all tower. Despite this, the position of the center of gravity of the tower can be stabilized by either blowing some of the compartments within the flotation unit 20 or some of the compartments adjacent the fixed collar 16 in the base members 17 where it will have little effect upon the opening or downward swinging movement of the base members.

The base members will continue to open until the sliding collar comes to rest against the stop 54. The lock means 55 are then actuated to lock the sliding collar 19 to the stop 54. In this condition the structure floats in the manner of a hydrometer. The derrick 15 is above the surface of the water. The platform may be at the waterline or raised above it. The remainder of the structure, which constitutes by far the greatest proportion of it, is submerged and the center of gravity is well below the surface of the water. In this position the tower is stable. The outwardly extended base members 17 act as stabilizers, preventing the tower from rotating, gyrating, or swinging as a pendulum. The resistance to movement exerted by the water against the extended base members and the lower portion of the tower operates as a highly effective stabilizer.

It is important to this invention that the several leg or base members 17 move together. Since they are positively connected to the sliding collar 19, which is common to all of the base members, one base member cannot move without corresponding movement of all other base members. This contributes materially to the stabilization of the tower since one base member cannot move outwardly as an independent unit to create an imbalance on one side which could tip the floating tower. Later, when the tower is finally resting on the marine floor at location, this coordinated movement of the legs provides stability since, in effect, the tower is braced from three, four, or more positions by the base members and their tying links 18. Further, the tower receives this support in two vertically spaced positions. First, the tower is supported at its lower end by the fixed collar 16 and at a point substantially above this it is supported by the sliding collar 19. This gives the tower great stability against bending loads which will be imposed upon it by the turbulence at and adjacent the surface of the water.

Figure 4:
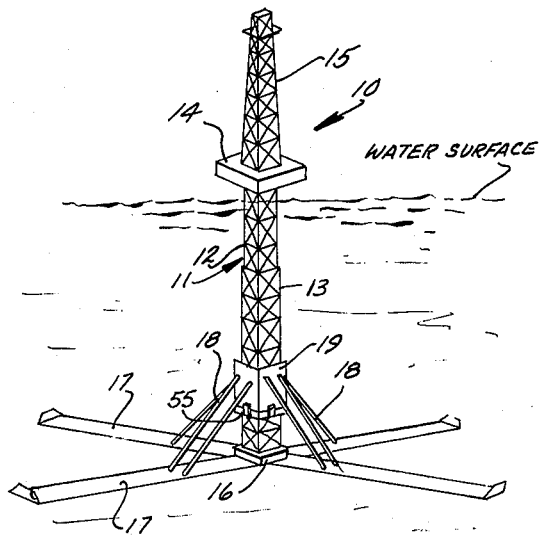
FIG. 4 is an oblique, somewhat schematic view showing the structure after it has righted itself and has opened its supporting base.

With the tower floating as illustrated in FIG. 4, the next step is to extend the tower by lowering the sleeve 13 until the base members 17 rests upon the marine floor. To do this, the lock holding the upper and lower sections 12 and 13 against relative movement is released. In doing this, care is exercised to make sure that the specific gravity of the upper section 12 is such that it has no marked tendency to either rise or sink. The same is true of the lower section. It is particularly important in this latter case to prevent it from accidentally sinking to the bottom without proper control. After the sections are released from each other, the switches 120 on the control panel 119, are manipulated to increase the buoyancy of the upper section or elevator shaft 12, causing it to float independently of the rest of the tower. During this maneuver, the platform 14 may be at the water's surface or it may be raised above the water, as illustrated in FIGS. 4 and 5.

Having conditioned the upper section 12 to float independently, the lower unit is weighted by manipulation of the switches 103 of the control panel 102 to increase the specific gravity of the lower unit. If further flooding can be accomplished in the sliding collar 19, this may also be undertaken through the switches 113. The result of this flooding is to cause the weight of the lower unit to move it downwardly until the base members 17 rest firmly on the marine floor. This maneuver extends the tower by, in effect, causing the lower section 13 to telescopically extend outwardly from the upper section 12 so that the tower reaches its planned extended height.

When the tower reaches a point just above the bottom by manipulation of the controls and thus of the specific gravity of the lower portion, further downward movement of the lower portion may be checked. At this point the controls on the panel 134 may be manipulated to rotate the tower or to shift it into position laterally in any suitable direction to align the tower precisely over the chosen location. When it has been precisely located, the controls on the control panel 134 are manipulated in such a fashion as to hold the tower in this position. Then once again compartments within the lower portion of the tower are flooded to cause the tower to move the rest of the distance down to rest on the marine floor.

When resting on the marine floor, the ridges 49 on the base members 17 embed themselves in the mud to further stabilize the tower and to hold it on location. If additional stability is desired, the tower may be equipped with remotely operated stabbing points which are forced down into the mud of the marine floor to a sufficient depth to assure a fixed location for the tower. The stabbing points may be erected before the base members 17 are open and the weight of the tower used to force them into the mud. It is also possible through suitable linkages with or without added counterweights to cause the stabbing points to open automatically as the base members are erected. When these maneuvers have been completed, the upper and lower sections are locked together. This may be done by divers proceeding down the center of the tower to effect the lock or it may be accomplished by remote control with suitable equipment. If the platform 14 is floating at the water's surface, prior to locking the upper and lower sections together, additional compartments within the floatation unit 20 may be blown, causing the upper portion of the tower to rise, lifting the platform 14 well above the surface of the water. Then the tower sections are locked together. After the tower sections are locked, the compartments within the floatation unit 20 may be flooded. This will tend to stabilize the tower and to add to its weight, driving it further down into the mud.

When the tower is finally positioned for operation, it is desirable that the platform 14 be positioned well above the water. Thirty-five to fifty feet is sufficient to raise this platform to a position where it is beyond almost all wave action. Since it presents a much larger surface for wave action than the open work of the tower itself, it is desirable to keep the platform at a sufficient elevation above the surface that waves will not break against it. With the tower in this position, the drilling operation can be commenced. The tower can remain on location as long as is necessary.

Since a number of wells are normally drilled from a single location, the bottom of the tower may be equipped with a conductor jacket before it is towed to location. If this has not been done, one may be lowered by suitable equipment through the tower and placed in position at the base of the tower within the fixed collar 16. If the tower is located in very deep water, the conductor jacket may be set by an operator lowered in an atmospheric chamber. In this case the tower will act as a guide for the chamber. There are other circumstances in which it may be necessary to use an atmospheric chamber such as for setting valving and performing other functions incident to completing a successful well. In these cases the tower is a useful guide in raising and lowering the chamber.

Not only does this invention provide a relatively easy and quick method to erect drilling towers, it also provides one which may be recovered. Recovery of a tower may be effected by reversing the procedure described for erecting the tower on location. This is particularly important because these towers are expensive and, having completed their job irrespective of whether it has been successful, it is normally desirable to remove the tower to a new location. To recover the tower, the lock between the upper and lower sections is released. Then the controls 102 and 112 are manipulated, forcing air into selected ones of the compartments 44 and 49 to cause the lower portion of the tower to rise because its specific gravity is reduced below that of the water. By gradually blowing a sufficient number of compartments, the floatation of the lower unit will be sufficient to withdraw the base members from the mud on the marine floor. The lower section is then allowed to float upwardly until it and the upper section are fully telescoped together. If the platform 14 has not been lowered to water level previously, the compartments in the floatation unit 20 are flooded sufficiently to lower the upper section of the tower until this occurs. The upper and lower sections are once again locked together.

With the unit once more floating in the manner of a hydrometer, the lock means 55 are released and the compartments at the outer ends of the base members 17 are blown, causing the outer ends to rise in the water. More and more compartments are blown, both in the base member 17 and in the sliding collar 19 until the base members are folded up into their original position where they encase the entire tower. The base members can now be locked again against inadvertent extension. When this has been completed, the compartments in the base member 17 adjacent the fixed collar 16 are blown to cause the tower unit to change its attitude, shifting from a normal position to a prone position where it once more floats on the surface of the water ready for towing to a new location.

In some instances it may be considered desirable not to recover all of the unit. The lower portion of the tower and the base members may be left on location to service a successful well or group of wells. To effect this, the upper section of the unit is released from the lower section and floated free of the lower section and then removed for reuse with a replacement lower section. The lower portion of the tower remains to serve as a guide for divers servicing the Christmas tree and other equipment which may be located at the head of the well. Also, the base members may be used as submerged storage compartments for oil by filling certain of them with oil rather than with water. If this is not done, the structure may be used as a means of locating and anchoring submerged oil tanks for storage purposes. While the lower portion of the unit is costly, it is less costly in some situations, particularly at great depths, to leave it on location for this purpose than to locate other structure of more conventional nature which would require the services of tenders and divers to complete its assembly on the marine floor.

In the following paragraphs, the operation of the structure illustrated in FIGS. 16–19 will be described. The movement of the tower to location is identical to that of the unit described in FIGS. 1 through 5. It is also true that the operation of opening the base members to extended position is identical. Once the base members have been extended to open position, the tower basically floats on the platform 14a. Of course the buoyancy of the lower portion of the tower is balanced at a point where the center of gravity of the entire tower is well below the water's surface but such that the platform 14a does not have to support the entire weight of the tower.

With the tower in this condition, the upper section or elevator shaft is raised to extended position. This is done by operation of the rack and driving pinion 80 and 81. The tower is extended to the height which it must be to permit the platform to be raised sufficiently above the water's surface when the tower is seated on the marine floor that the platform will be free of wave action. During this operation the platform 14a remains at water level. The height to which the upper section is to be raised is predetermined by the surveys of the location which have already determined the water depth.

Once the upper section has been extended to the desired height, the two sections 12a and 13 are locked together. Also, at this time the compressed air lines, electrical circuits, and other service and control means can be coupled together at the joint between the upper and lower sections. Up to this point, temporary connections for these service and control lines have been used. These connections are now made permanent for the operating period of the tower and permit the control and service lines to be of types which are largely confined within the structural elements of the tower where they are protected from injury. This particular construction has the advantage of permitting this to be done above water level where it may be accomplished more easily because it is more readily accessible. Once the sections have been locked together, the pinion and rack 80 and 81 are actuated in reverse, forcing the tower down through the platform 14a until the base members 17 come to rest on the marine floor. To facilitate this maneuver, certain of the compartments within the base member 17 may be flooded to increase the specific gravity of the tower as a whole. Also, during this maneuver the jets 130, 130a, suggested in FIG. 15, may be actuated to manipulate the tower to an exact predetermined location. When the tower has come to rest on the marine floor, the platform 14a is raised well above the water to escape wave action by moving it up the rack 80 to the desired position. This position would be at the base of the derrick 15. From this point on, the use of the tower will involve all of the same procedures and advantages that are available from the tower illustrated in FIGS. 1 through 5.

To recover this tower, the procedure previously described is reversed. The platform 14a is lowered to water level where it will act as a float. The specific gravity of the base members 17 is then reduced by blowing a selected number of the compartments and the tower is once more raised through the platform 14a until the point where the upper and lower sections are locked together is accessible above water level. The sections are then unlocked and the upper section is lowered into the lower section. After this has been completed, the tower is folded up and pivoted to a prone position in exactly the same manner as that described for the recovery of the tower illustrated in FIGS. 1 through 5.

The elevator shaft 12a of the tower illustrated in FIGS. 16–19 may omit a floatation unit corresponding to the floatation unt 20. However, such a floatation unit can be useful in this type of tower construction. By regulating the specific gravity of the elevator shaft 12a, it can be caused to sink or float, relieving the gear and rack combination of almost all of the heavy lifting it would otherwise have to perform. In this case, the gear and rack combination would act primarily only as a regulatory means. It can be of lighter construction and will require only a fraction of the power which would otherwise be necessary for its operation.

It is also feasible in both forms of the tower, that is, the form illustrated in FIGS. 1–5 and the form illustrated in FIGS. 16–19, to use a trapper air type of floatation control. In this construction, the individual air compartments have a bottom post open at all times to the water while the top is a closed air trap. Initially these compartments are filled with air at atmospheric pressure. As the tower is lowered in the water, the increase in pressure will compress the air, reducing its volume. Thus, the floatation characteristics of the tower will be reduced because the volume of water displaced by the air controls buoyancy. When the buoyancy is insufficient to properly support the tower at the correct level, additional air may be forced into these compartments to displace some or all of the water. When the buoyancy is excessive, some of the air can be released from selected compartments to increase the total volume of water in these compartments.

In the case of compartments which have had additional air forced into them, the excess air will be released through the open ports as the tower raises due to expansion of volume as the water pressure decreases. The application of this principle has the advantage of maintaining a balance of interior and exterior pressures on all compartments at all times. Thus, the structure of these compartments can be substantially reduced. This in turn reduces both the weight and cost of the tower.

It is entirely possible to combine this principle with the closed compartment principle described in connection with FIGS. 1–5 and 16–19. In this case, selected compartments will be sealed while others will have an open port and will act as air traps. To reduce structural requirements for the sealed compartments, air may be admitted to or exhausted from them to increase or reduce their internal pressure to correspond to changes in external pressure as the tower is lowered and raised. Thus, the pressures on the compartment walls can be substantially neutralized.

This invention has a number of advantages over existing structures designed for this purpose. The center of gravity of the structure is lower than that of the so-called jack-up or submersible units. The great bulk of the structure is on the marine floor where it does the most good rather than being at or above the surface of the water where it is exposed to side pressures and other forces which generate severe strains within the structure. While it is being erected on location, it acts like an inverted pendulum with the bulk of the structure submerged. In this condition, it not only has a low center of gravity but it also is extremely stable. This makes it possible to erect it in reasonably rough water. It can be erected under climatic conditions which render the erection of more conventional structures extremely dangerous if not impossible.

The structure provides a wide purchase on the marine floor. This provides a large area of bearing on the marine mud and also permits the stabbing points to be located well out from the center line of the tower where they will be more effective than is true with conventional structures.

The structure has a substantial advantage over any known conventional structure inasmuch as it uses the differences in specific gravity between the structure and the water to effect its opening, closing, and extension. This eliminates the necessity for large, complex, and expensive gears, drive equipment, and similar mechanical or hydraulic assemblies. This makes the structure not only less costly and lighter in weight but it makes it more dependable and easier to manipulate. Further, there is no necessity for protecting this type of complex drive equipment against the effects of water and particularly of sea water and marine life.

The cost of the structure, by reason of its simplicity, is substantially less than that of comparable structures per foot of water depth capability. Despite this fact, it has water depth capability which has not yet been achieved by any other known unit. The construction adapts itself to modular design. A single design may be modified to function for a number of different depths. With a single base structure arrangement, one, two, or more elevator towers may be added to increase the capability of the structure from one hundred and fifty or two hundred feet to six hundred or even more feet of water depth. This makes the structure versatile and it materially reduces the cost of the structure by standardizing the construction and reducing the cost of enginering each structure as a custom design.

The structure, while described basically as an all drilling tower, may also be used for a number of other purposes. It may be used to replace a light ship in offshore locations. It may be used as an ocean refueling station or as an underwater storage station. Other uses are possible because of its stability, ease of erection, and its deep water capabilities.

While the structure has been described with a base structure designed to rest upon a flat marine floor, it is entirely possible to modify the structure to rest upon an irregular marine floor. In this case, the surveys of the marine floor will have determined beforehand the degree of irregularity and its nature. In this case, one or more of the links 18 may be made extensible so that one or more of the base members 17 may be lowered to a point more or less than ninety degrees from the center line of the tower. This condition will be pre-set before the unit is towed to location. Thus, the base members will be pre-conditioned to fit the marine floor before they are finally lowered to make contact. With this arrangement, the tower can be lowered to seat exactly on the marine floor and have a full purchase throughout all portions of the bottoms of the base members.

It will be understood that the modifications described as well as many others may be made in this invention without departing from the principles of the invention. All of these modifications are to be considered as included in the hereinafter appended claims unless these claims by their language expressly state otherwise.

We claim:

1. A derrick for use in deep water, said derrick comprising: a first slender elongated element of fixed length and a second similar slender elongated element of fixed length, said second element slidably telescopically interfitting within said first element for extension and retraction by relative movement lengthwise of said elements with said second element moving through one end of said first element; said first element seating closely about said second element and engaging it to guide the telescopic movements of the elements with respect to each other; means for changing the specific gravity of one of said elements with respect to a surrounding body of liquid for effecting extension and retraction of said elements in relation to each other; a plurality of base members hingedly connected to the other end of said first element and movable from an extended derrick supporting position extending laterally outwardly from said elements to a retracted position generally parallel to the lengthwise axis of said derrick; said base members having a plurality of compartments therein; means for admitting and exhausting water and air to and from said compartments to change the specific gravity of said base members relative to a surrounding body of water for effecting their movement to and from retracted position.

2. A derrick for use in deep water as defined in claim 1 wherein said base members in retracted position are generally parallel to the lengthwise axis of said elements of said derrick and substantially encase said first element.

3. A derrick for use in deep water, said derrick comprising: a slender elongated upper element of fixed length and a similar slender elongated lower element of fixed length, said upper element slidably and telescopically interfitted within said lower element for extension and retraction by relative movement of said elements, with said upper element moving through one end of said lower element; said lower element seating closely about said upper element and engaging it to guide the telescopic movements of the elements with respect to each other, parallel to the lengthwise axis of said elements; said upper element having a first floatation unit at its lower end; a plurality of base members each hingedly connected to the lower end of said lower element; each of said base members having a second floatation unit; said base members being movable from an extended position projecting laterally from said elements and substantially normal to the lengthwise axis of said derrick to a retracted position substantially parallel to the lengthwise axis of said derrick; first means for admitting and exhausting air and water to and from said first floatation unit for extending and retracting said derrick by changing the specific gravity of said upper element relative to a surrounding body of water; second means for admitting and exhausting air and water to and from said second floatation units for extending and retracting said base members by changing their specific gravity relative to a surrounding body of water.

4. A derrick for use in deep water, said derrick comprising: a slender elongated upper element of fixed length and a similar slender elongated lower element of fixed length, said upper element slidably and telescopically interfitted within said lower element for extension and retraction by relative movement of said elements parallel to the lengthwise axes of said elements, with said upper element moving through one end of said lower element; said lower element seating closely about said supper element and engaging it to guide the lengthwise telescopic movements of the elements with respect to each other; a plurality of base members each hingedly connected to the lower end of said lower element; a collar slidably mounted on and surrounding said lower element and engaging said lower element for sliding movement lengthwise thereof and brace elements of fixed length connecting said collar to each of said base members at a point spaced substantially from said hinge connections of said base members to said lower element; said base members being movable from an extended position projecting laterally from said elements and substantially normal to the lengthwise axis of said lower element to a position substantially parallel thereto and said collar sliding lengthwise of said lower element as said base members move and tying said brace members together for simultaneous movement; said base members having a plurality of compartments therein; means for admitting and exhausting water and air to and from said compartments to change the specific gravity of said base members relative to a surrounding body of water for effecting their movement to and from erected position.

5. A derrick for use in deep water, said derrick comprising: a slender elongated upper element of fixed length and a similar slender elongated lower element of fixed length, said upper element slidably and telescopically interfitted within said lower element for extension and retraction by relative movement of said elements parallel to the lengthwise axes of said elements, with said upper element moving through one end of said lower element; said lower element seating closely about said upper element and engaging it to guide the lengthwise telescopic movements of the elements with respect to each other; a plurality of base members each hingedly connected to the lower end of said lower element; a collar slidably mounted on and surrounding said lower element and engaging said lower element for sliding movement lengthwise thereof and brace elements connecting said collar to each of said base members at a point spaced substantially from said hinge connections of said base members to said lower element; said base members being movable from an extended position projecting laterally from and substantially normal to the lengthwise axis of said lower element to a position substantially parallel thereto; said collar tying said base members together for simultaneous movement; said base members having a plurality of compartments therein; first means for admitting and exhausting water and air to and from selected ones of said compartments to change the specific gravity of said base members relative to a surrounding body of water for effecting their movement to and from erected position; one of said upper and lower elements having a plurality of compartments therein; second means for admitting and exhausting water and air to and from selected ones of said compartments for changing the specific gravity of one of said elements with respect to the other and with respect to a surrounding body of water for effecting extension and retraction of said tower.

6. A derrick for use in deep water, said derrick comprising: a slender elongated upper element of fixed length and a similar slender elongated lower element of fixed length, said upper element slidably and telescopically interfitted within said lower element for extension and retraction by relative movement of said elements parallel to the lengthwise axes of said elements, with said upper element moving through one end of said lower element; said lower element seating closely about said upper element and engaging it to guide the lengthwise telescopic movements of the elements with respect to each other; a plurality of base members each hingedly connected to the lower end of said lower element; a collar slidably mounted on and surrounding said lower element and engaging said lower element for sliding movement lengthwise thereof and brace elements connecting said collar to each of said base members at a point spaced substantially from said hinge connections of said base members to said lower element; said collar tying said base members together for simultaneous movement; said base members being movable from an extended position projecting laterally from and substantially normal to the lengthwise axis of said lower element to a position substantially parallel thereto; said base members having a plurality of first compartments; first means for admitting and exhausting water and air to and from said compartments to change the specific gravity of said base members relative to a surrounding body of water for effecting their movement to and from erected position; said collar having a plurality of second compartments; second means for admitting and exhausting water and air to and from said compartments to change the specific gravity of said collar relative to a surrounding body of water for effecting its movement along said lower element in cooperation with said base members.

7. A derrick for use in deep water as defined in claim 6 wherein said upper element has a plurality of compartments; third means for admitting and exhausting water and air to and from said compartments for changing the specific gravity of said upper element with respect to a surrounding body of water for effecting extension and retraction of said derrick.

8. A derrick for use in deep water, said derrick comprising: a slender elongated upper element of fixed length and a similar slender elongated lower element of fixed length, said upper element slidably and telescopically interfitted within said lower element for extension and retraction by relative movement of said elements parallel to the lengthwise axes of said elements, with said upper element moving through one end of said lower element; said lower element seating closely about said upper element and engaging it to guide the lengthwise telescopic movements of the elements with respect to each other; a portion of said upper element projecting outwardly beyond the upper end of said lower element when said elements are telescopically retracted together; a plurality of base members each hingedly connected to the lower end of said lower element; said base members being movable from an extended position projecting laterally from and substantially normal to the lengthwise axis of said lower element to a retracted position substantially parallel thereto; a plurality of links, each having one end pivotally joined to one of said base members; the other end of each of said links being pivotally and slidably connected to said lower element for movement lengthwise thereof; said base members having a plurality of compartments therein; means for admitting and exhausting water and air to and from said compartments to change the specific gravity of said base members relative to a surrounding body of water for effecting their movement to and from erected position; a platform surrounding said upper element and connected to said portion of said upper element; said platform having a specific gravity substantially less than that of water; said base members when retracted entirely encasing said lower element and at the upper end thereof forming an opening of a size only sufficient to permit said portion of said upper element to extend therethrough.

9. A derrick for use in deep water, said derrick comprising: a slender elongated upper element of fixed length and a similar slender elongated lower element of fixed length, said upper element slidably and telescopically interfitted within said lower element for extension and retraction by relative movement of said elements parallel to the lengthwise axes of said elements, with said upper element moving through one end of said lower element; said lower element seating closely about said upper element and engaging it to guide the lengthwise telescopic movements of the elements with respect to each other; a portion of said upper element projecting outwardly beyond the upper end of said lower element when said elements are telescopically retracted together; a plurality of base members each hingedly connected to the lower end of said lower element; said base members being movable from an extended position projecting laterally from and substantially normal to the lengthwise axis of said lower element to a retracted position parallel thereto; a plurality of links, each having one end pivotally joined to one of said base members; the other end of each of said links being pivotally and slidably connected to said lower element for movement parallel to the lengthwise axis thereof; said base members having a plurality of compartments therein; means for admitting and exhausting water and air to and from said compartments to change the specific gravity of said base members relative to a surrounding body of water for effecting their movement to and from erected position; a platform surrounding said upper element and detachably connected to said portion of said upper element; said platform having a specific gravity substantially less than that of water whereby when released from said upper element said platform will float independently; said base members when retracted entirely encasing both said platform and said lower element and at the upper end thereof forming an opening of a size only sufficient to permit said portion of said upper element to extend therethrough.

10. A derrick for use in deep water, said derrick comprising: a slender elongated upper element of fixed length and a similar slender elongated lower element of fixed length, said upper element slidably and telescopically interfitted within said lower element for extension and retraction by relative movement of said elements parallel to the lengthwise axes of said elements, with said upper element moving through one end of said lower element; said lower element seating closely about said upper element and engaging it to guide the lengthwise telescopic movements of the elements with respect to each other; said upper element having one end projecting outwardly from one end of said lower element; an upper floatation unit mounted on said derrick and surrounding the upper end of said upper element and through which said upper element projects; a lower floatation unit mounted in said lower element and means for admitting and exhausting water and air to and from said lower floatation unit for changing the specific gravity of said derrick with respect to a surrounding body of water; powered means having a driving member and a driven member engaged to each other, said driving member being mounted on one of said upper floatation unit and said upper element and said driven member being mounted on the other thereof for extending and retracting said upper element with respect to the lengthwise axis of said lower element through both said one end of said lower element and said upper floatation unit and also for moving said upper floatation unit lengthwise of said upper element when said upper element is vertically stationary.

11. A derrick for use in deep water as described in claim 10 wherein said upper element has a floatation unit of variable specific gravity and means for controlling the specific gravity of said floatation unit for facilitating the extension and retraction of said upper element to and from said lower element.

12. In a method of erecting an elongated deep water structure of telescopic construction, the steps which include: providing a slender, elongated structure having a pair of elements telescopically movable with respect to each other along the lengthwise axis of said structure; in retracted position locking the elements together against relative axial movement; surrounding said structure with a buoyant platform; floating said structure in water substantially submerged with its greater dimension normal to the surface of the water and maintaining said platform at the surface of the water; unlocking the elements for movement relative to each other parallel to their lengthwise axes; decreasing the specific gravity of the upper elements of said structure and telescopically extending said upper element above the platform; locking the elements together in extended position against relative lengthwise movement and increasing the specific gravity of the lower of said elements and lowering said extended structure into the water until it rests on a supporting surface and simultaneously moving said platform lengthwise of the structure to maintain said platform at the surface of the water, supporting said platform on the water by the buoyancy of said platform during the lowering of said extended structure.

13. In a method of erecting an elongated deep water structure of telescopic construction, the steps which include: providing a slender, elongated structure having a pair of elements telescopically movable with respect to each other along the lengthwise axis of said structure; in retracted position locking the elements together against relative axial movement; surrounding said structure with a buoyant platform; floating said structure in water substantially submerged with its greater dimension normal to the surface of the water while maintaining said platform at the surface of the water and both a major portion of the structure and its center of gravity below the surface of the water; unlocking the elements for movement relative to each other parallel to their lengthwise axis; decreasing the specific gravity of the upper of the elements of said structure and telescopically extending said upper element by withdrawing it from the water and projecting it above the platform and simultaneously reducing the specific gravity of the submerged portion of the lower of the elements of the structure to maintain said platform at the surface of the water; locking the elements together in extended position against relative lengthwise movement and increasing the specific gravity of the lower one of the elements of the structure and lowering said extended structure with respect to said platform and sliding the structure through said platform until said structure rests on a supporting surface while simultaneously maintaining said platform at the surface of the water, supporting said platform on the water by said platform's own buoyancy during the lowering of said extended structure.

14. A derrick for use in deep water, said derrick comprising: a slender elongated upper element of fixed length and a similar slender elongated lower element of fixed length, said upper element slidably and telescopically interfitted within said lower element for extension and retraction by relative movement of said elements parallel to the lengthwise axes of said elements, with said upper element moving through one end of said lower element; said lower element seating closely about said upper element and engaging it to guide the lengthwise telescopic movements of the elements with respect to each other; said upper element having a first floatation unit fixedly secured to its lower end; a base connected to the lower end of said lower element; one of said base and said lower element having a second floatation unit fixedly secured thereto; first means for varying the air volume of said first floatation unit for extending and retracting said derrick by changing the specific gravity of said upper element relative to a surrounding body of water; second means for varying the air volume of said second floatation unit for raising and lowering said lower element by changing its specific gravity relative to a surrounding body of water; a third floatation unit surrounding said derrick and movable along the upper element parallel to the lengthwise axis thereof and serving as a water surface guide and operational control center; control means mounted on said third floatation unit for moving said third floatation unit along said upper element to maintain said third floatation unit at the surface of the water while said upper element is moved vertically with relation thereto.

15. A deep water structure comprising: a derrick having a first slender, elongated element and a second slender, elongated element telescopically interfitting one within the other; each of said elements being of fixed length; said derrick being extendible and retractable by relative movement of said elements with said second element moving lengthwise through one end of said first element; a plurality of base members hingedly connected to the other end of said first element and movable from an extended position projecting laterally from and generally normal to the lengthwise axis of said derrick to a retracted position parallel to said lengthwise axis of said derrick; said base members having a plurality of compartments therein; first means for admitting and exhausting water and air to and from those of said compartments adjacent the free ends of said base members for effecting the pivotal movement of said base members about said hinge connections; second means for admitting and exhausting water and air to and from those of said compartments adjacent said hinge connections for effecting the raising and lowering of said first element by changing the specific gravity of said first element and the attached base members relative to a surrounding body of water; a collar, said collar slidably surrounding said first element for lengthwise movement therealong; links joining said collar to each of said base members; said collar having floatation control compartments; third means for admitting and exhausting water and air to and from said floatation control compartments for urging said collar to move lengthwise of said first element in cooperation with said base members by changing the specific gravity of said collar with respect to a surrounding body of water.

16. A deep water structure comprising: a derrick having an elongated, slender upper element and an elongated, slender lower element telescopically joined together for relative movement one within the other parallel to the lengthwise axes of said elements; each of said elements being of fixed length; said upper element having a first floatation unit fixedly secured to its lower end; a plurality of base members each hingedly connected to the lower end of said lower element; a collar seated about said lower element and slidable lengthwise thereof; a plurality of links each having one of its ends pivotally connected to one of said base members; the other end of each of said links being pivotally connected to said collar; each of said base members having a second floatation unit; said base members being movable from an extended position projecting laterally from and substantially normal to the lengthwise axis of said elements to a retracted position substantially parallel thereto; first means for admitting and exhausting air and water to and from said first floatation unit for extending and retracting said derrick by changing the specific gravity of said upper element relative to a surrounding body of water; second means for admitting and exhausting air and water to and from said second floatation units for extending and retracting said base members by changing their specific gravity relative to a surrounding body of water; said collar having a third floatation unit; third means for admitting and exhausting air and water from said third floatation unit for facilitating the sliding movement of said collar lengthwise along said lower element by changing the specific gravity of said third floatation unit relative to a surrounding body of water.

References Cited by the Examiner
UNITED STATES PATENTS

| | | | |
|---|---|---|---|
| 2,308,743 | 1/1943 | Bulkley et al. | 61—46.5 |
| 2,422,168 | 6/1947 | Kirby | 61—46.5 |
| 2,430,014 | 11/1947 | Hansen | 61—46.5 |
| 2,846,851 | 8/1958 | Pelham | 61—46.5 |
| 2,857,744 | 10/1958 | Swiger et al. | 61—46.5 |
| 2,921,442 | 1/1960 | Laborde et al. | 61—46.5 |
| 2,947,148 | 8/1960 | Young | 61—46.5 |
| 3,025,678 | 3/1962 | Dawson | 61—46.5 |
| 3,062,014 | 11/1962 | Newcomb | 61—46.5 |
| 3,099,912 | 8/1963 | Wolff | 61—46.5 |

FOREIGN PATENTS 606,033   8/1948   Great Britain.

OTHER REFERENCES

World Oil, pages 108, 110 and 112, Feb. 1, 1950.

EARL J. WITMER, *Primary Examiner.*
WILLIAM I. MUSHAKE, *Examiner.*